United States Patent [19]

Clausing

[11] 4,205,207
[45] May 27, 1980

[54] DRAW OUT CIRCUIT BREAKER ASSEMBLY

[75] Inventor: Challiss I Clausing, Marlton, N.J.

[73] Assignee: Gould Inc., Rolling Meadows, Ill.

[21] Appl. No.: 869,777

[22] Filed: Jan. 16, 1978

[51] Int. Cl.² .............................................. H01H 9/20
[52] U.S. Cl. ............................... 200/50 AA; 361/336
[58] Field of Search .................. 200/50 AA; 361/335, 361/336, 337, 342

[56] References Cited
U.S. PATENT DOCUMENTS

| 3,920,938 | 11/1975 | Netzel et al. | 200/50 AA |
| 4,101,744 | 7/1978 | Wilson | 200/50 AA |

Primary Examiner—James R. Scott
Attorney, Agent, or Firm—Ostrolenk, Faber, Gerb & Soffen

[57] ABSTRACT

A cradle for a circuit breaker secured in a cubicle in a switchboard wherein the cradle has a pair of side tracks forming the structural support for the entire cradle and a rear wall of insulating material which carries the upper and lower stationary disconnect contacts, pads for connection thereof to buses in the switchboard, secondary contacts, auxiliary switches, current transformers, grounding devices and an anchor point with respect to which the circuit breaker racking mechanism can operate. The cradle may also be shipped as a base for the circuit breaker and separated prior to installation. The cradle also provides interlocks for the circuit breaker and interference blocks to allow entry into the cubicle of only selected circuit breakers. The device is further shown in U.S. Pat. Nos. 4,146,764, 4,101,744 and 4,146,765.

9 Claims, 24 Drawing Figures

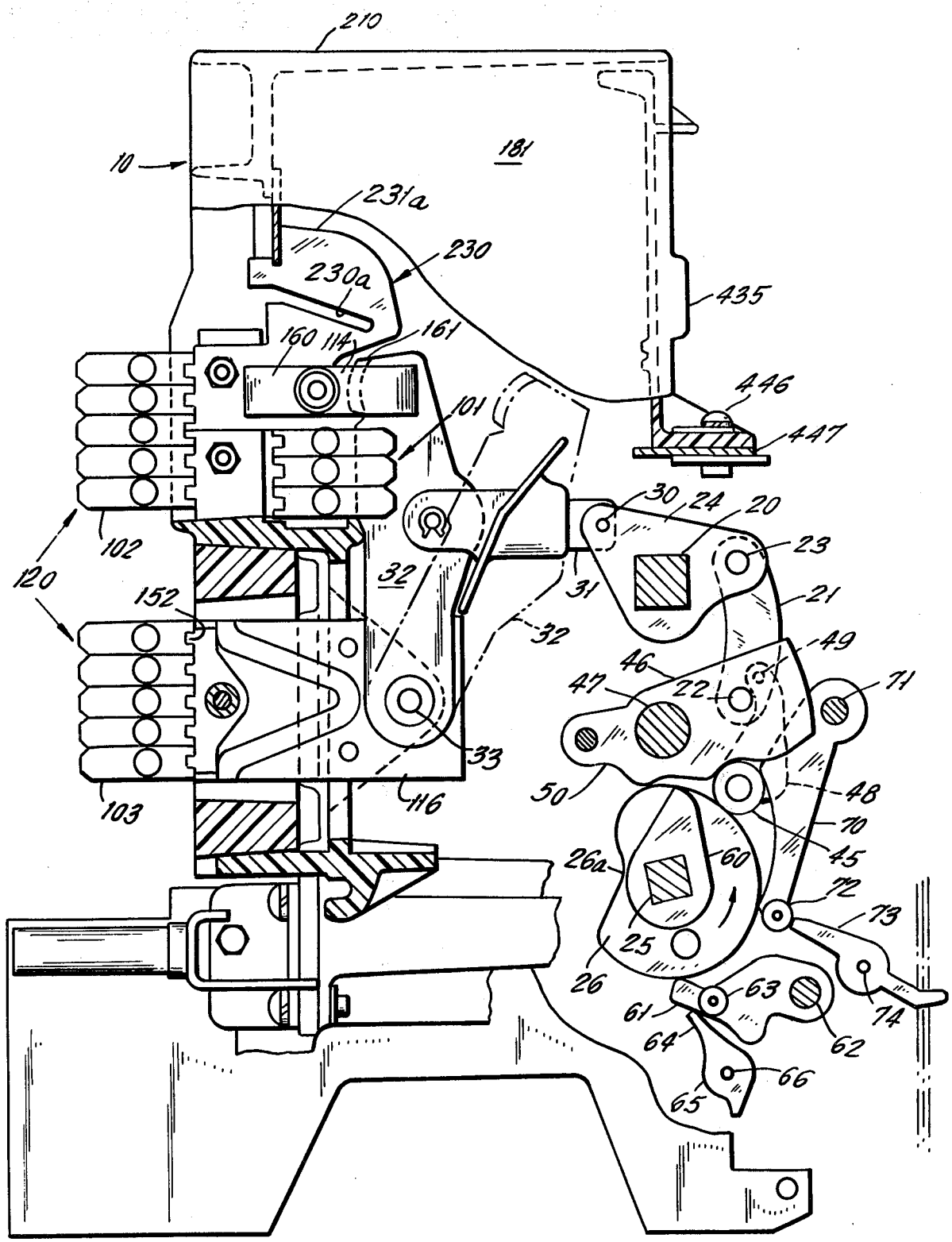

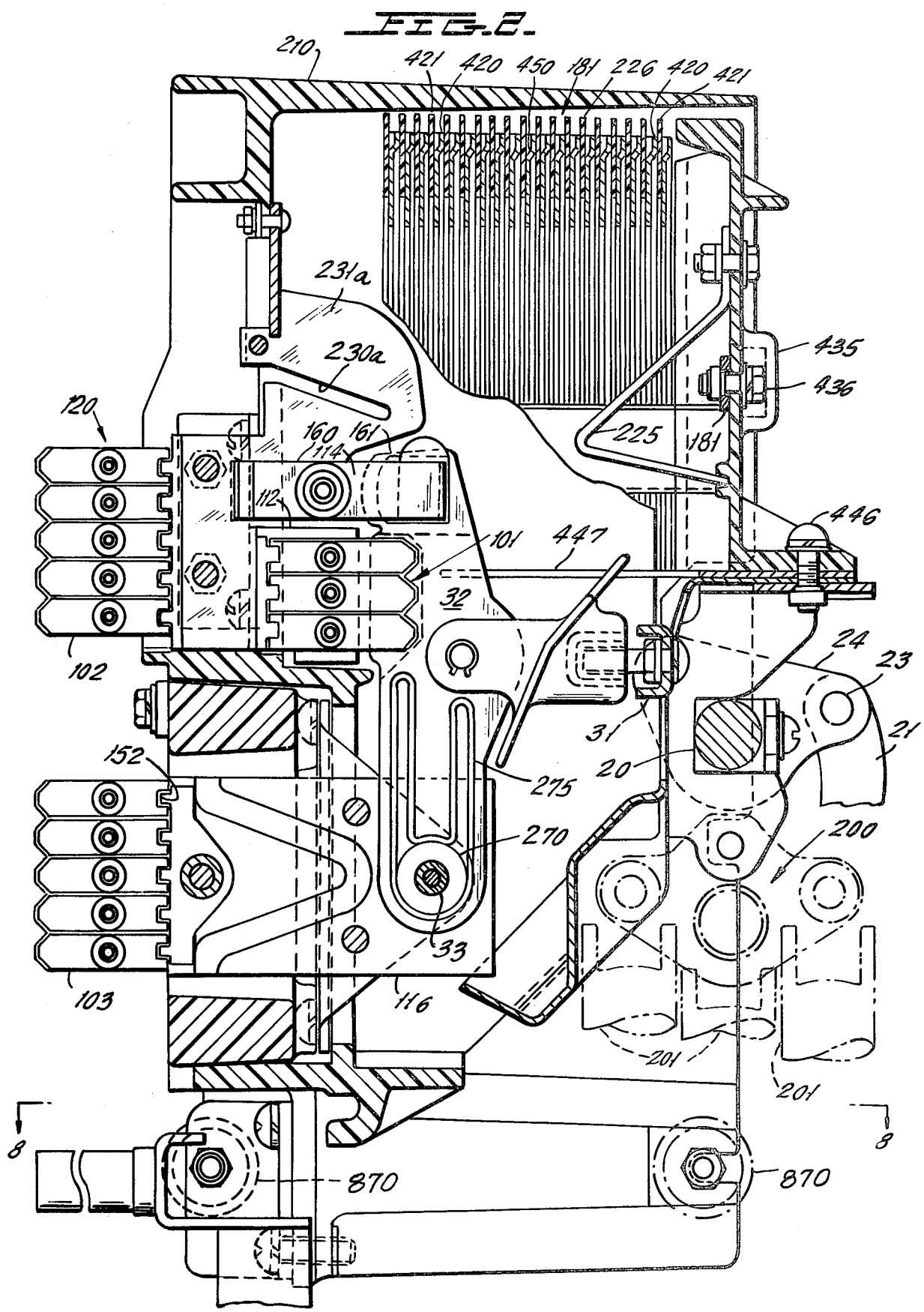

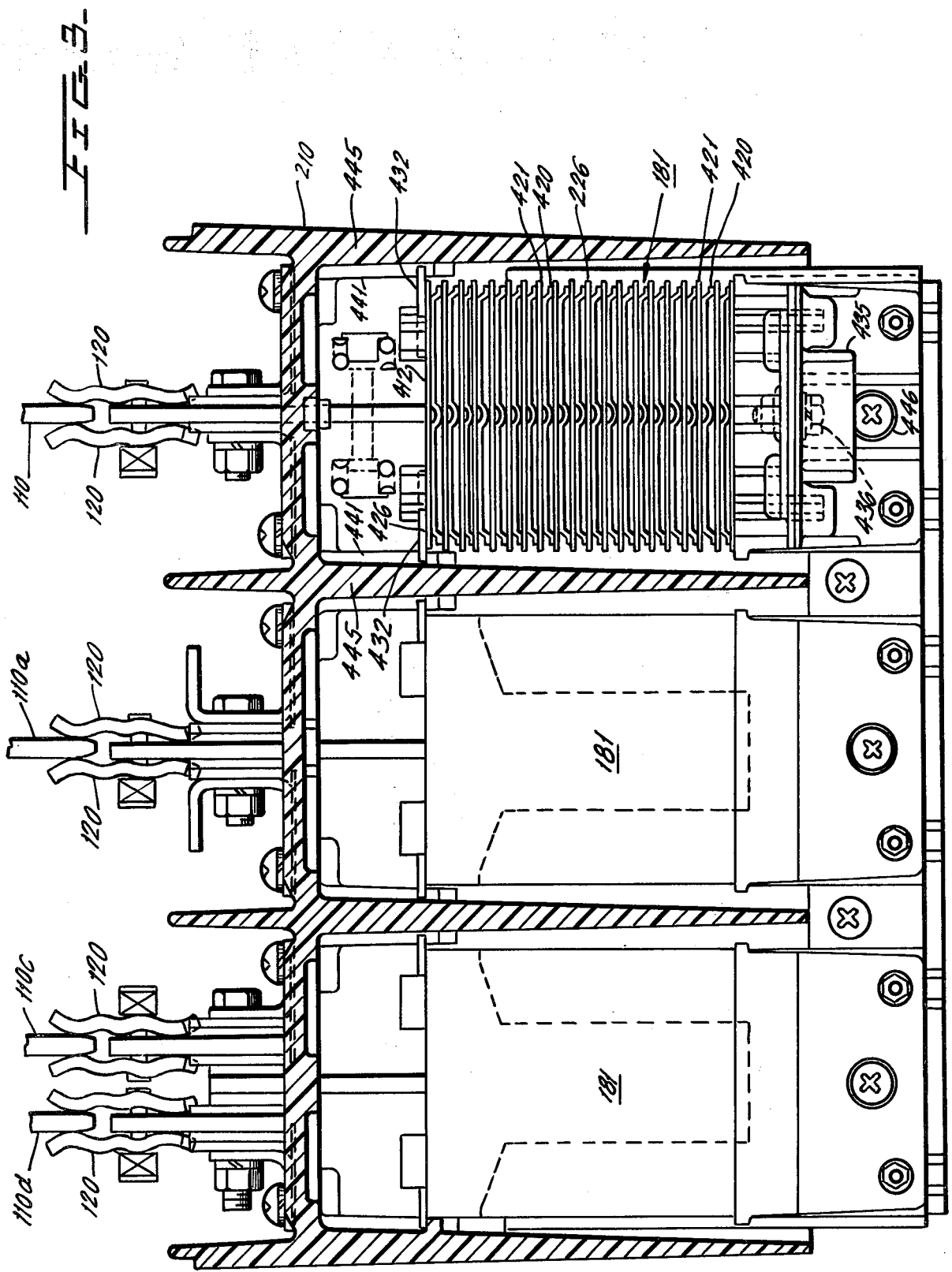

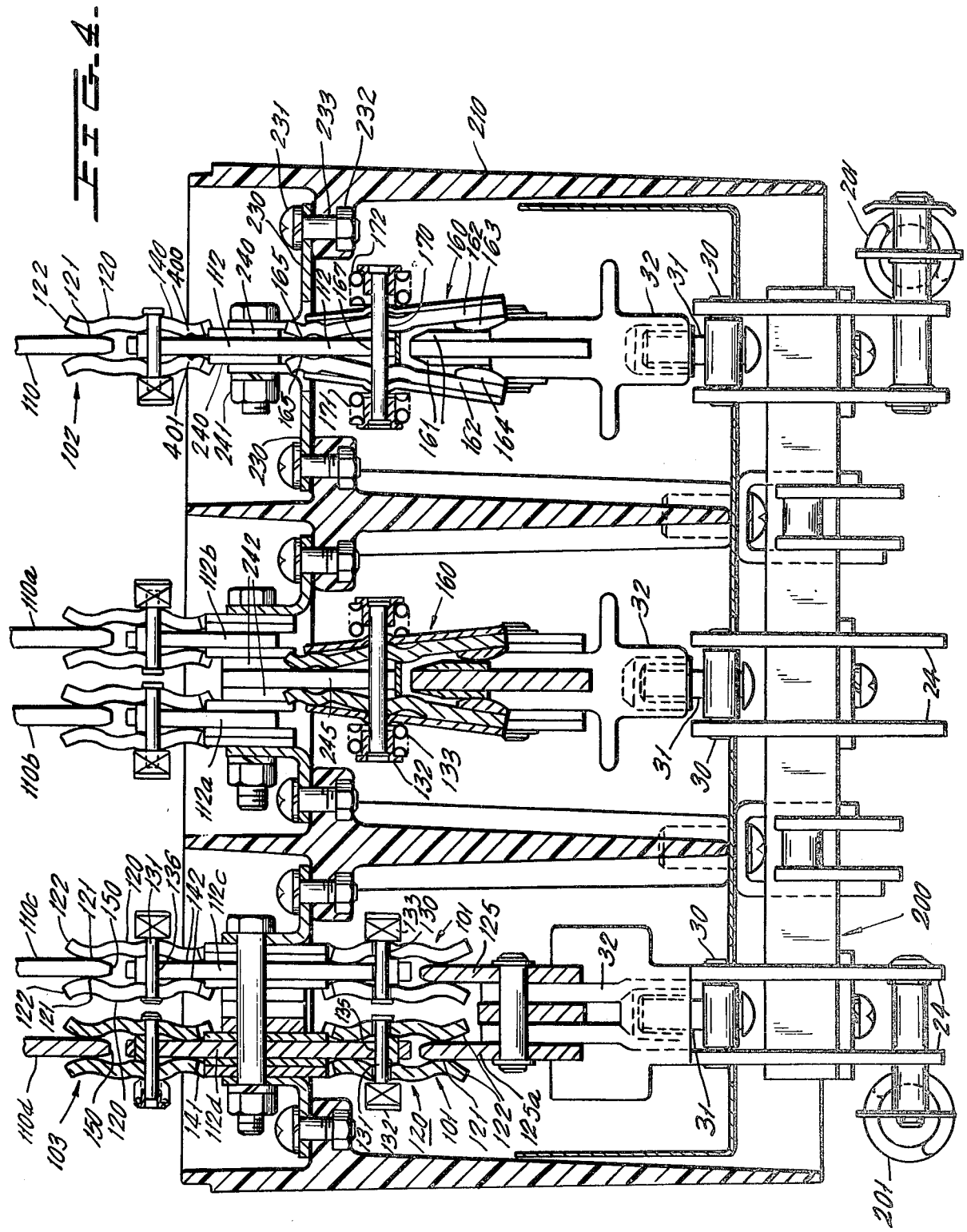

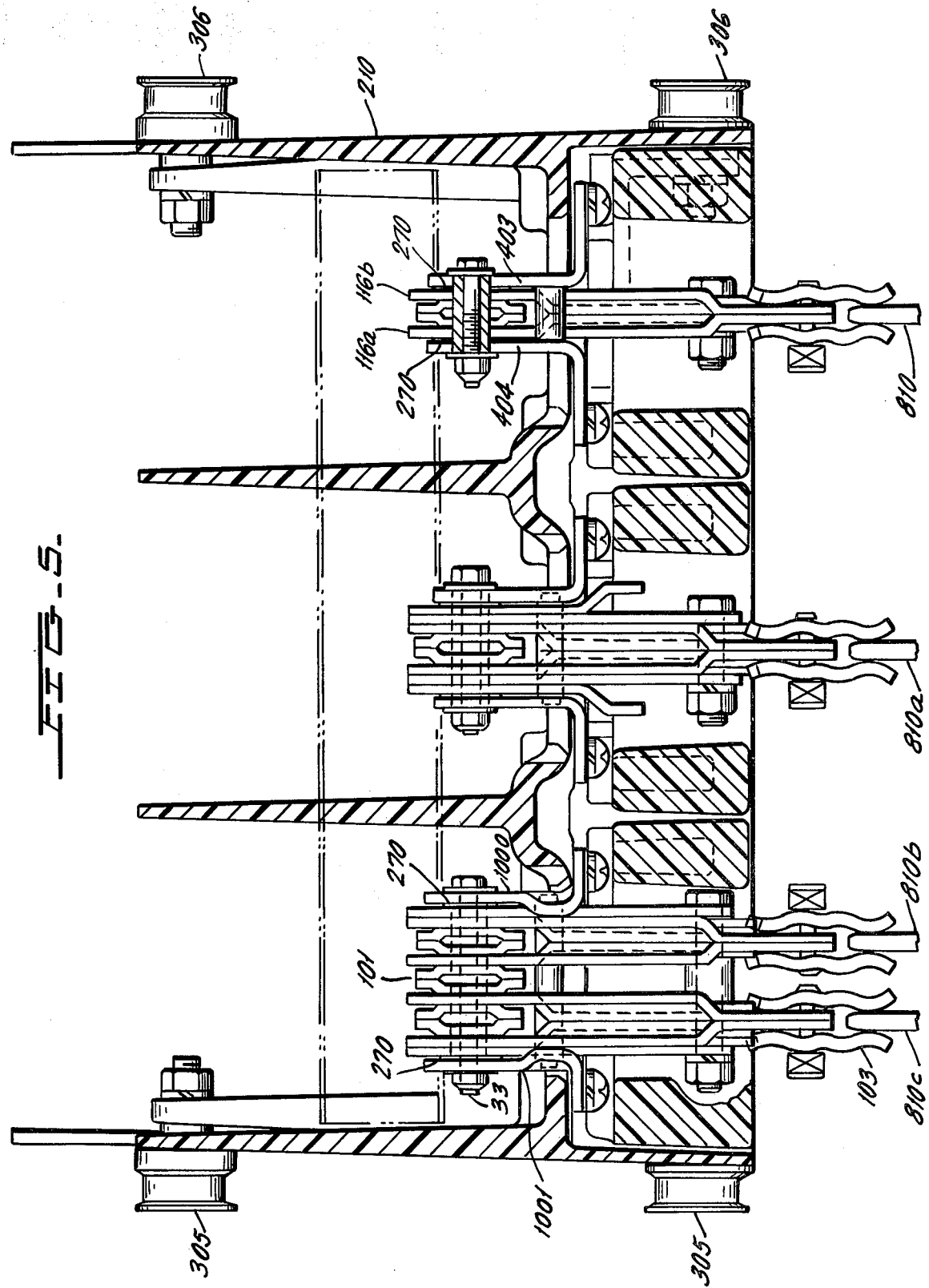

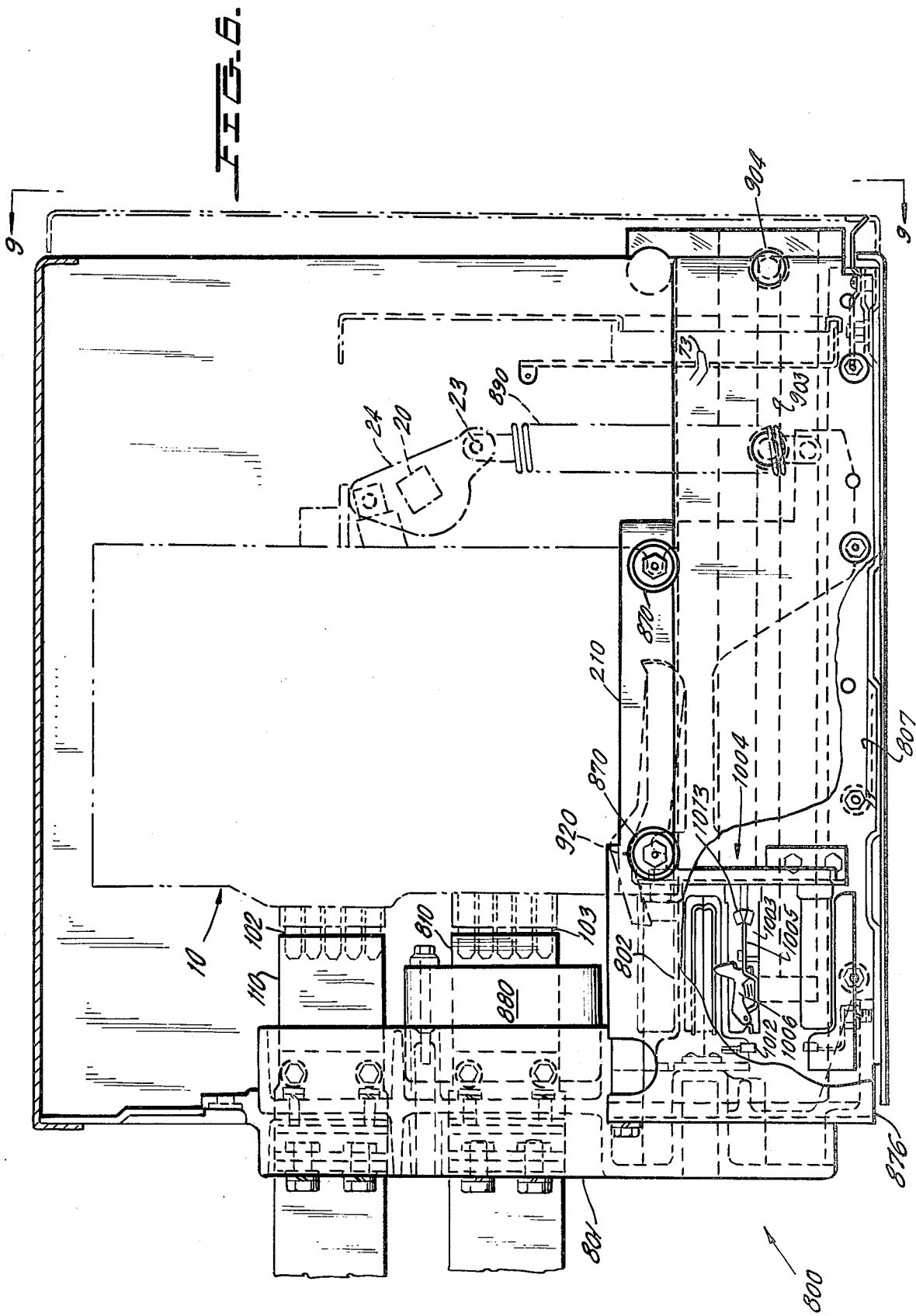

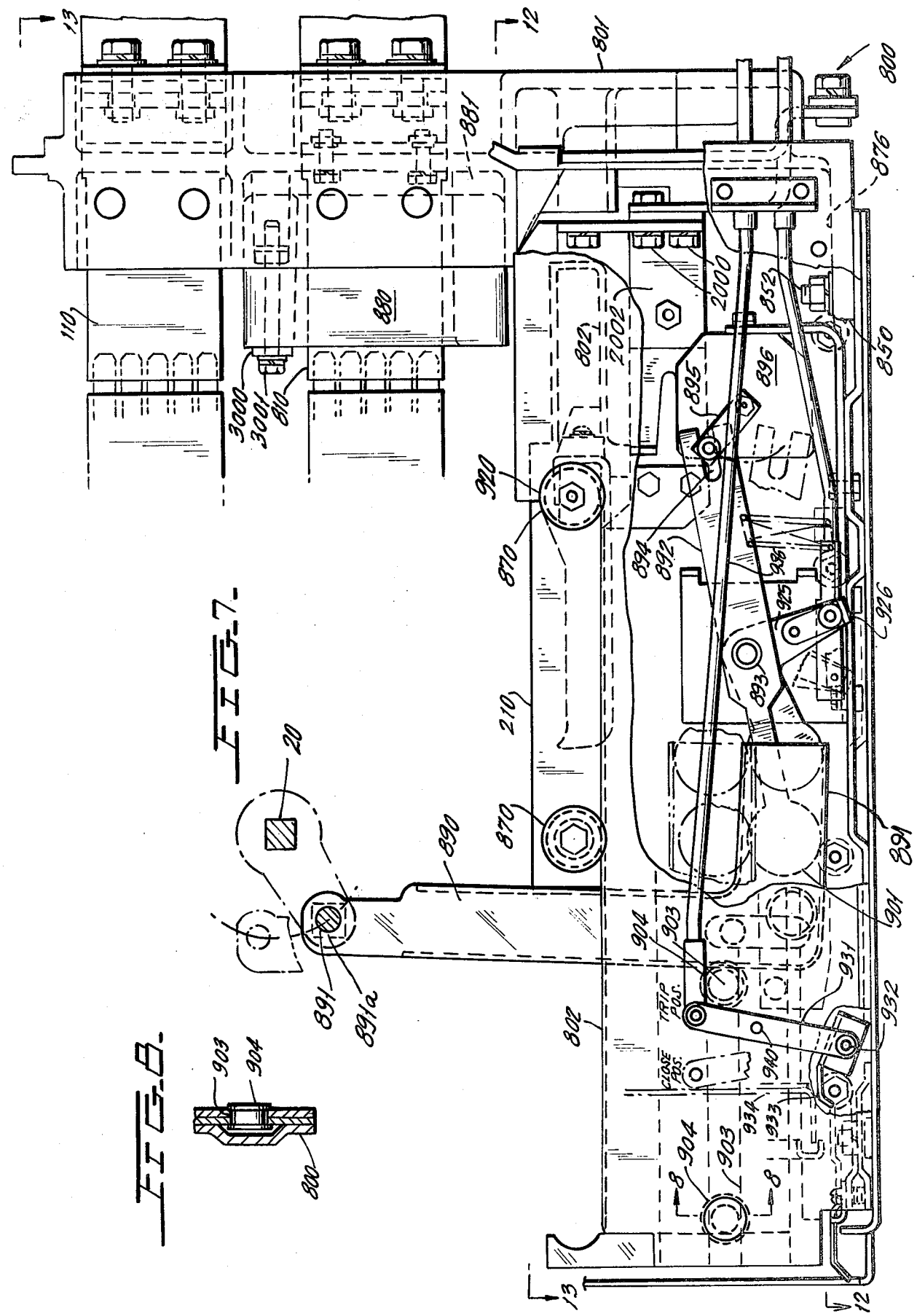

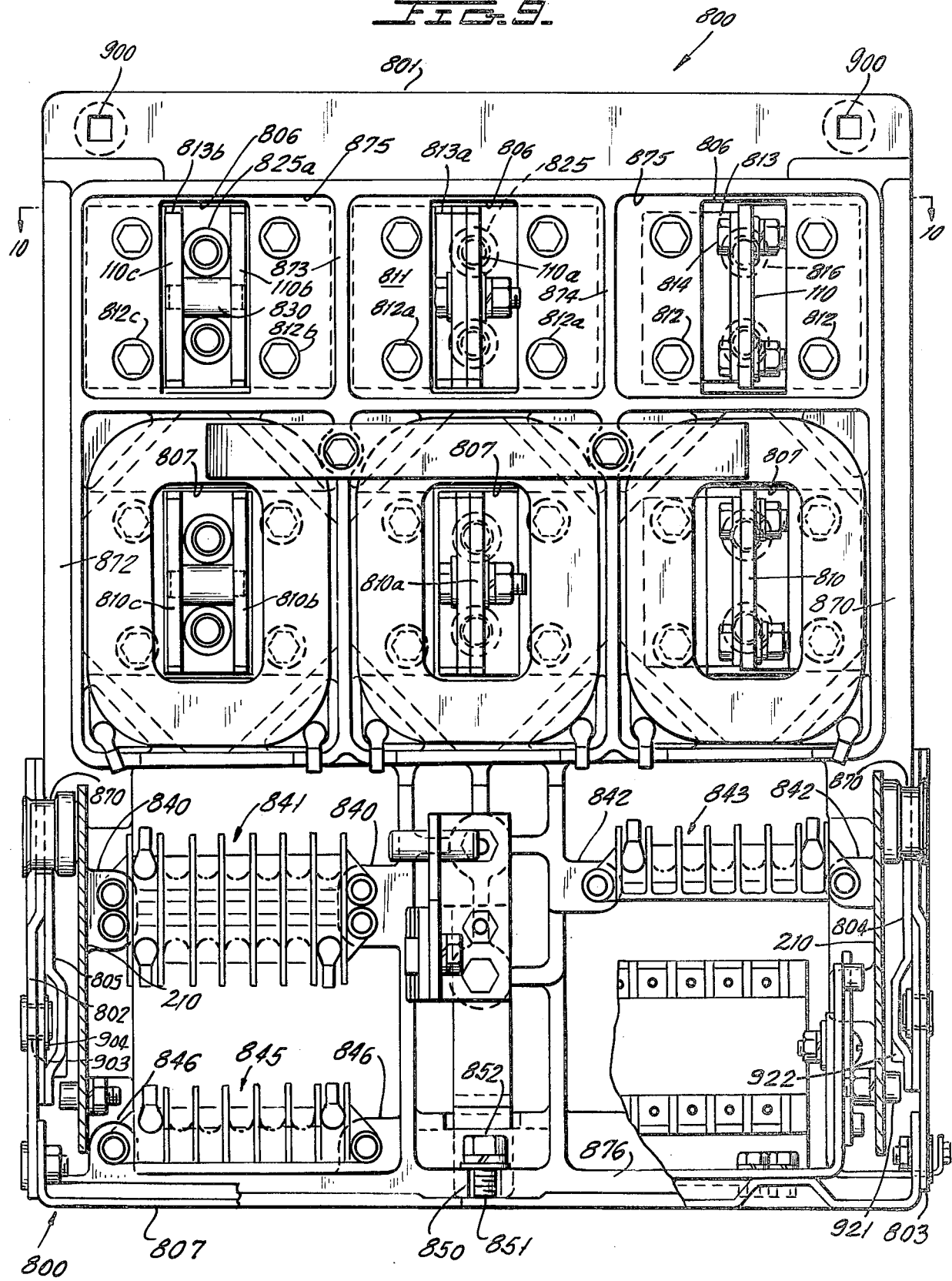

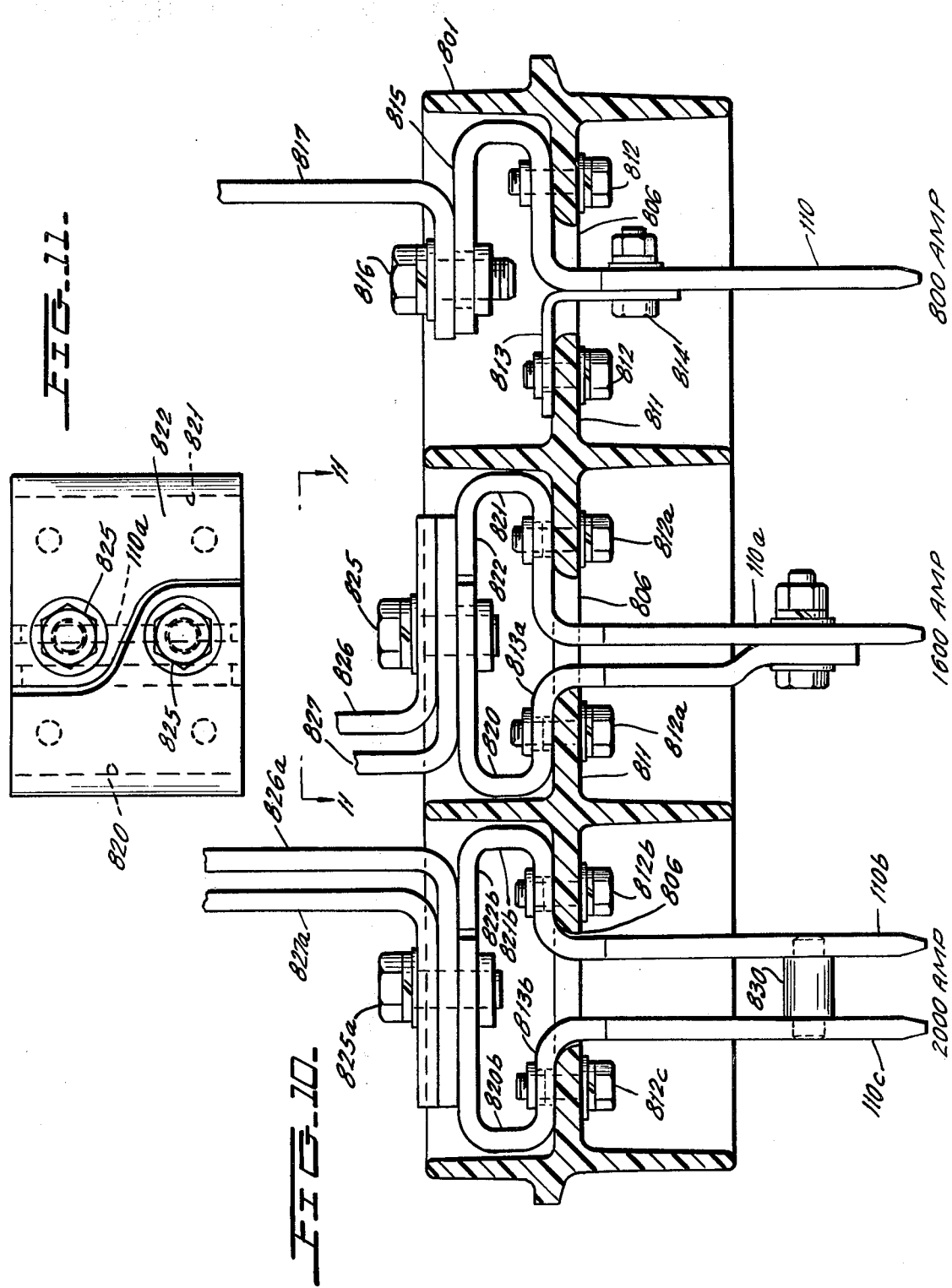

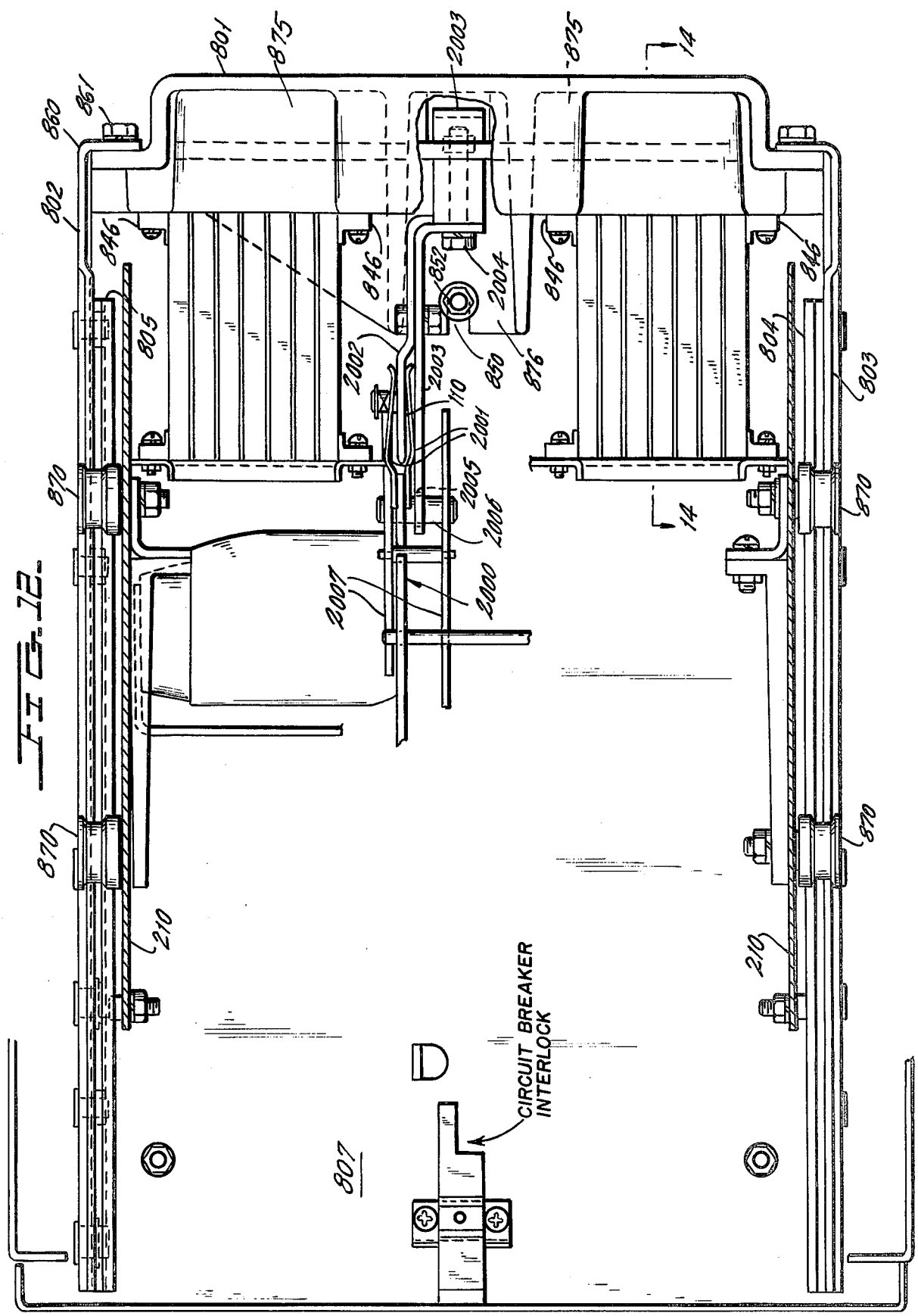

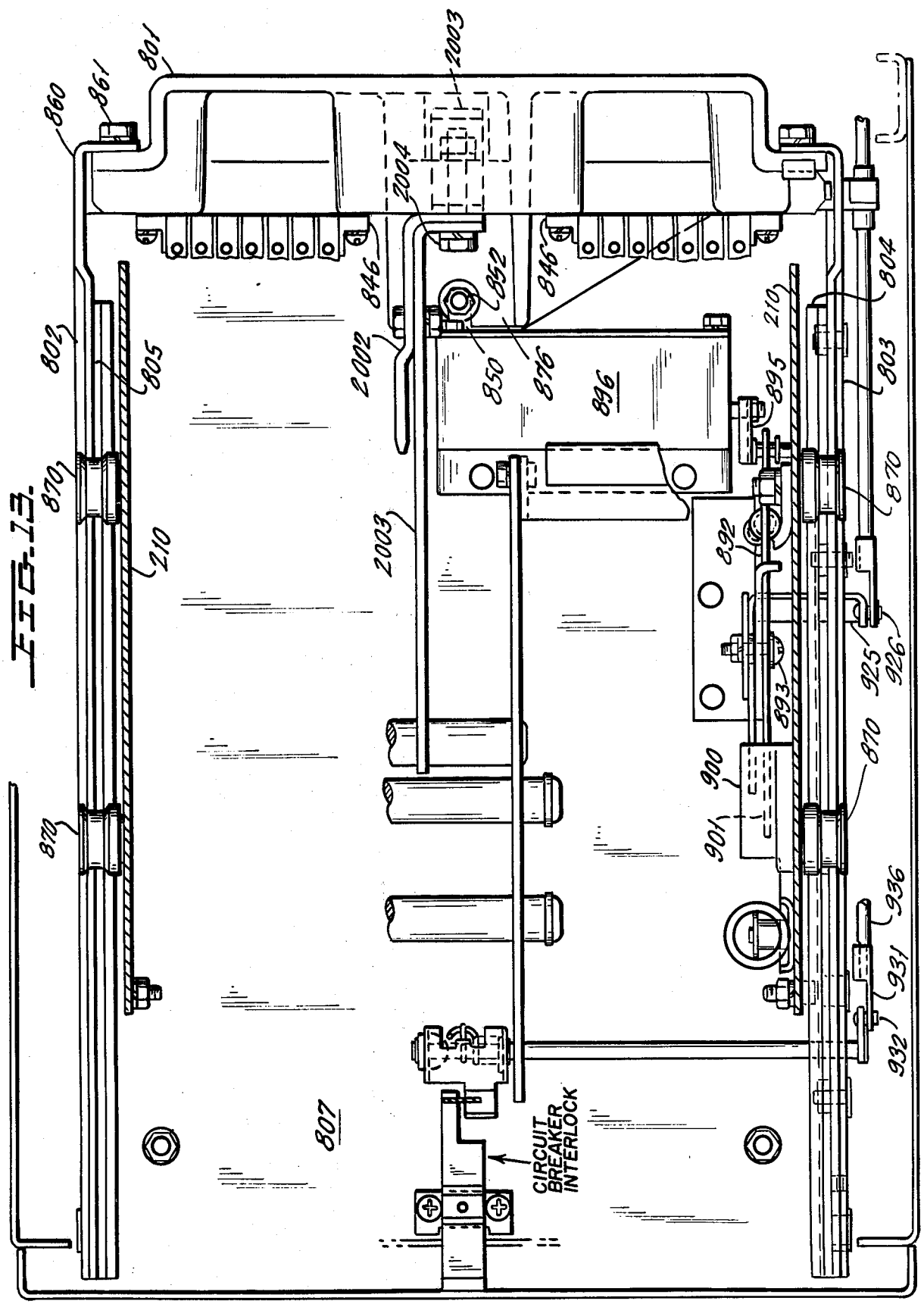

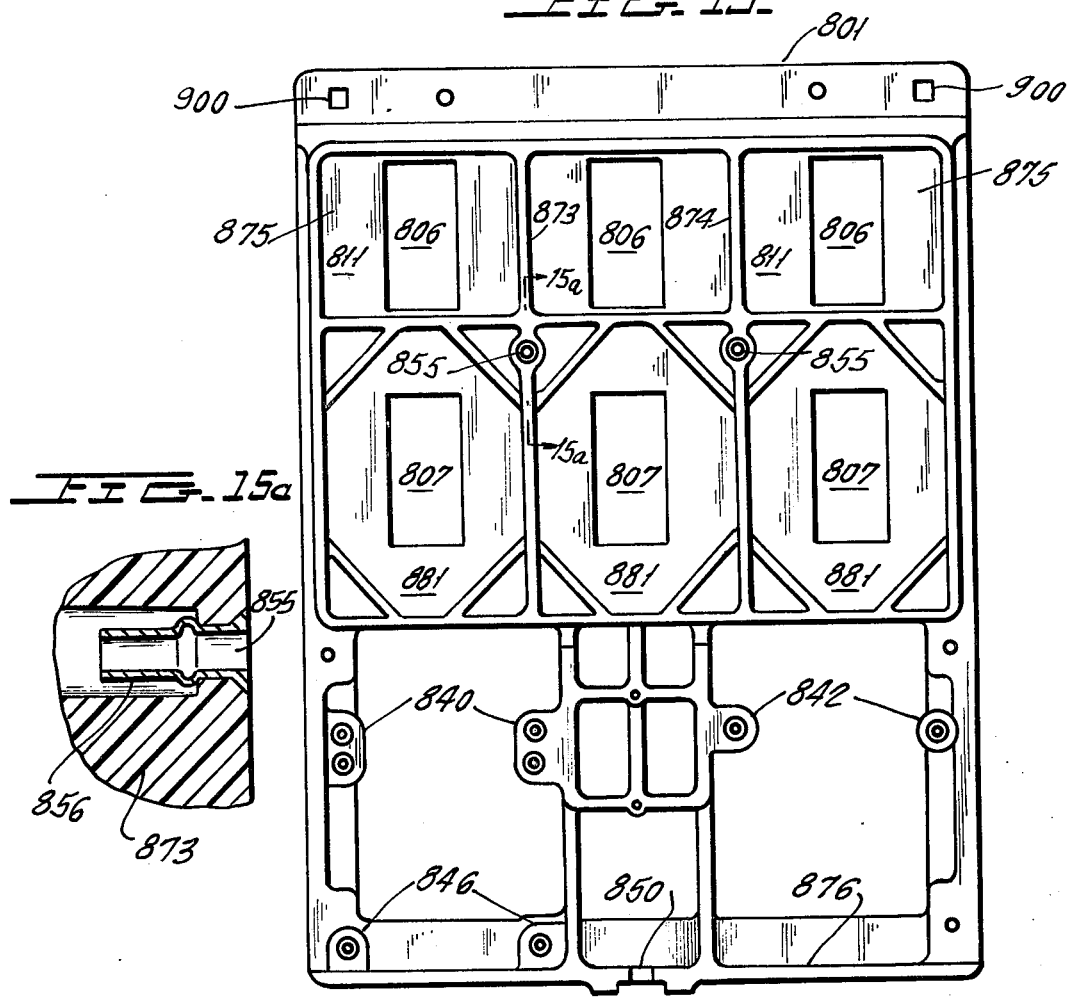
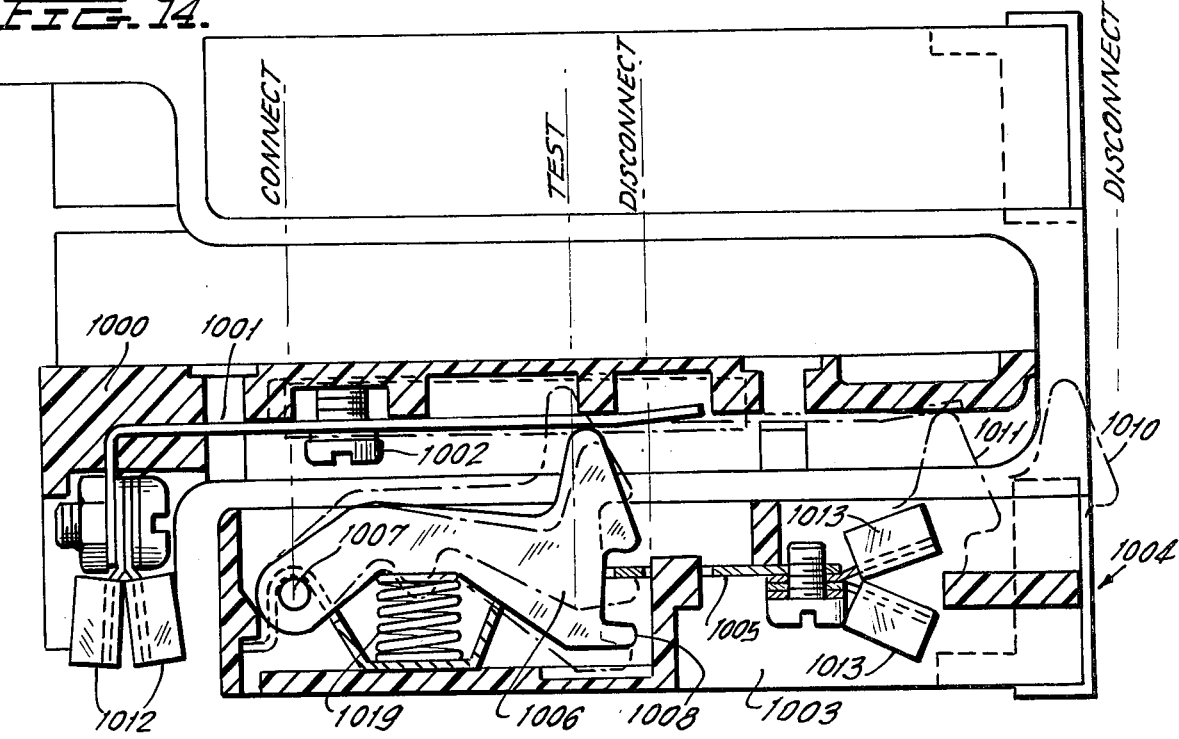

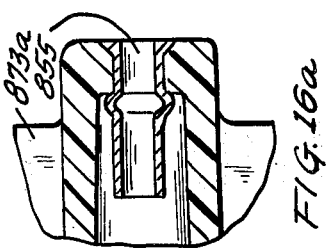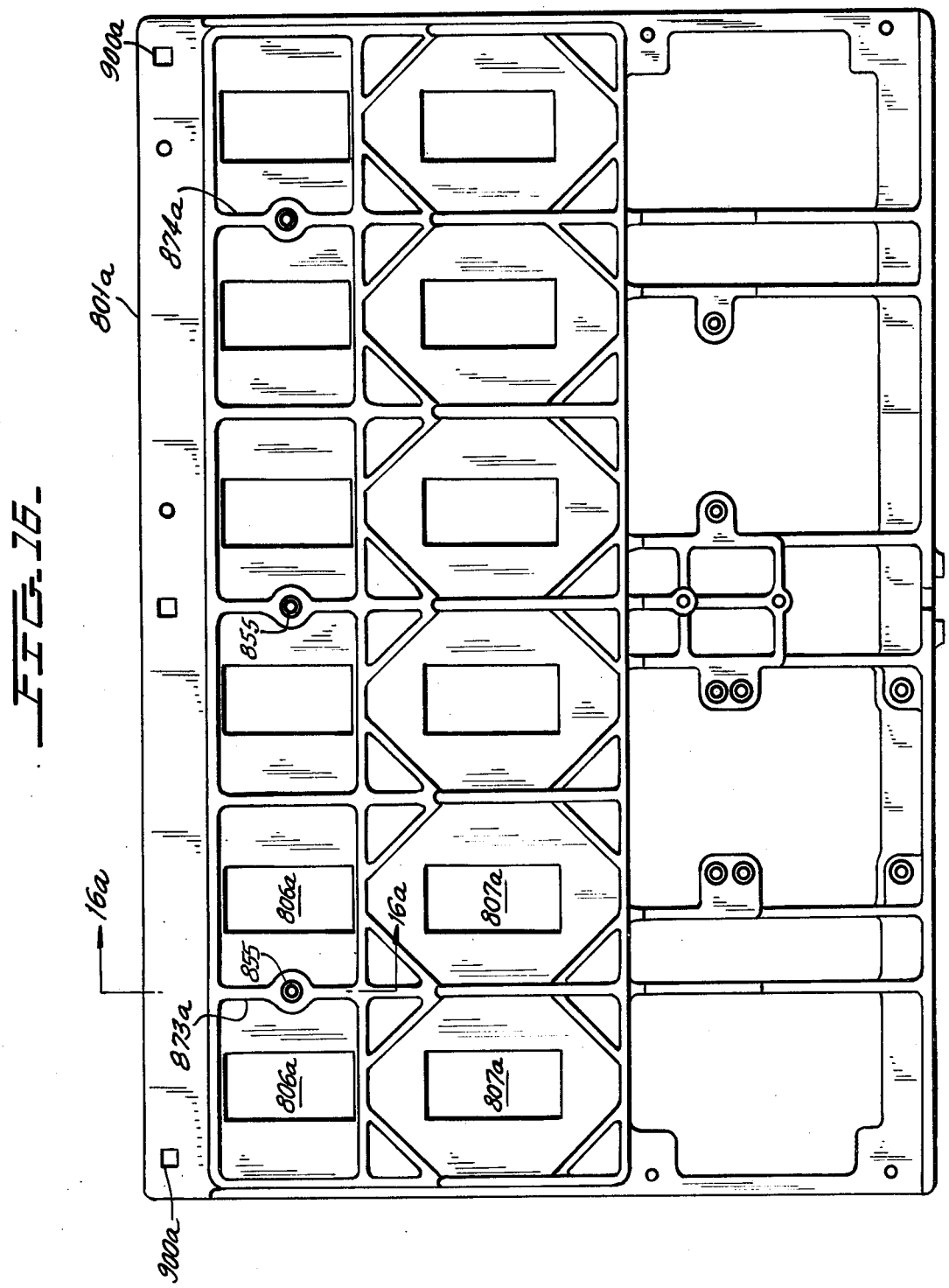

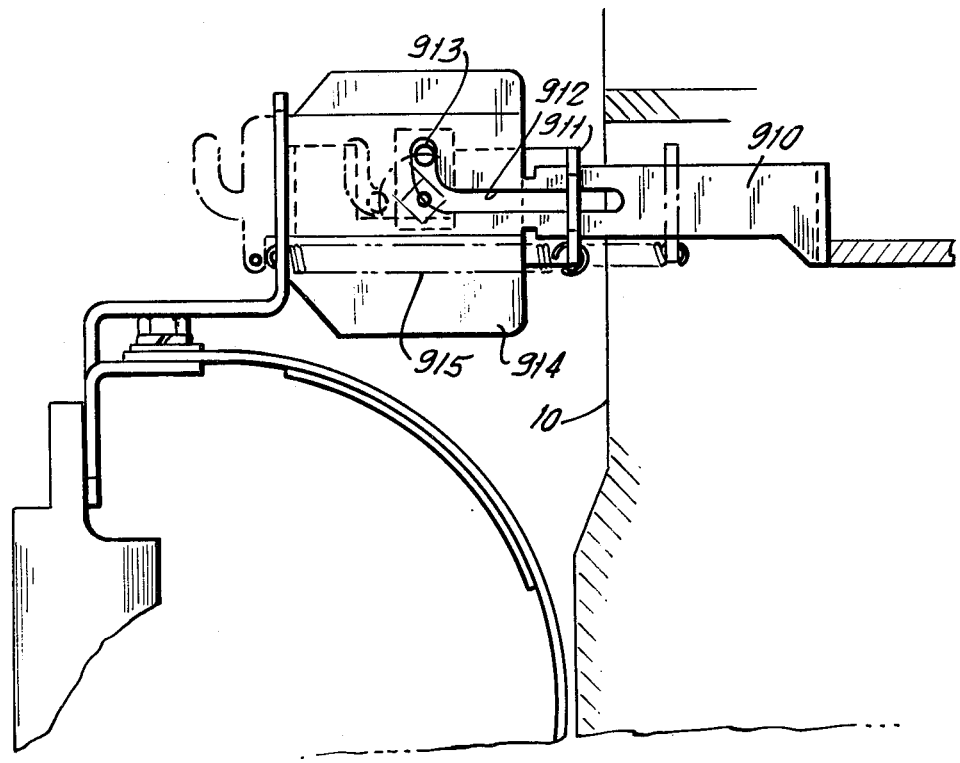
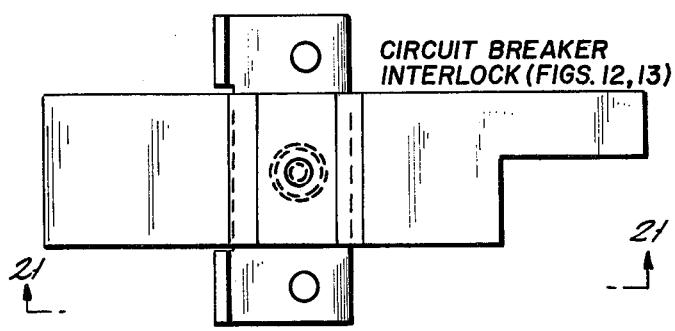
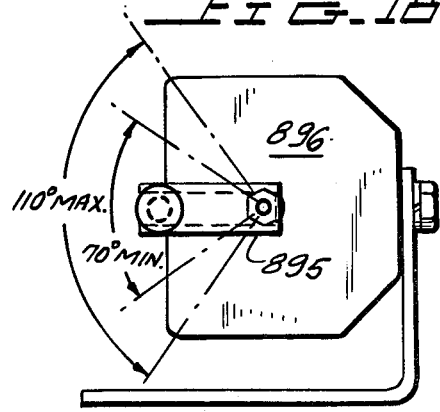
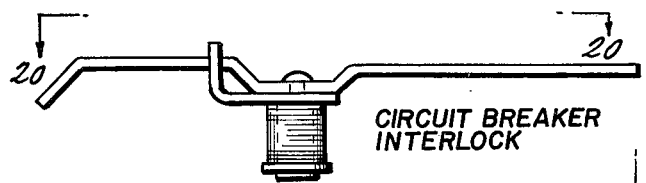
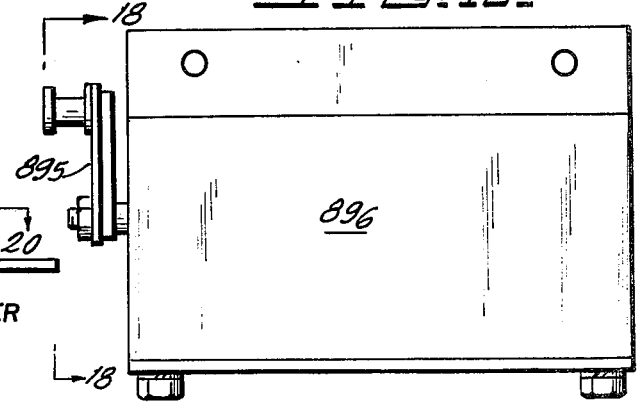

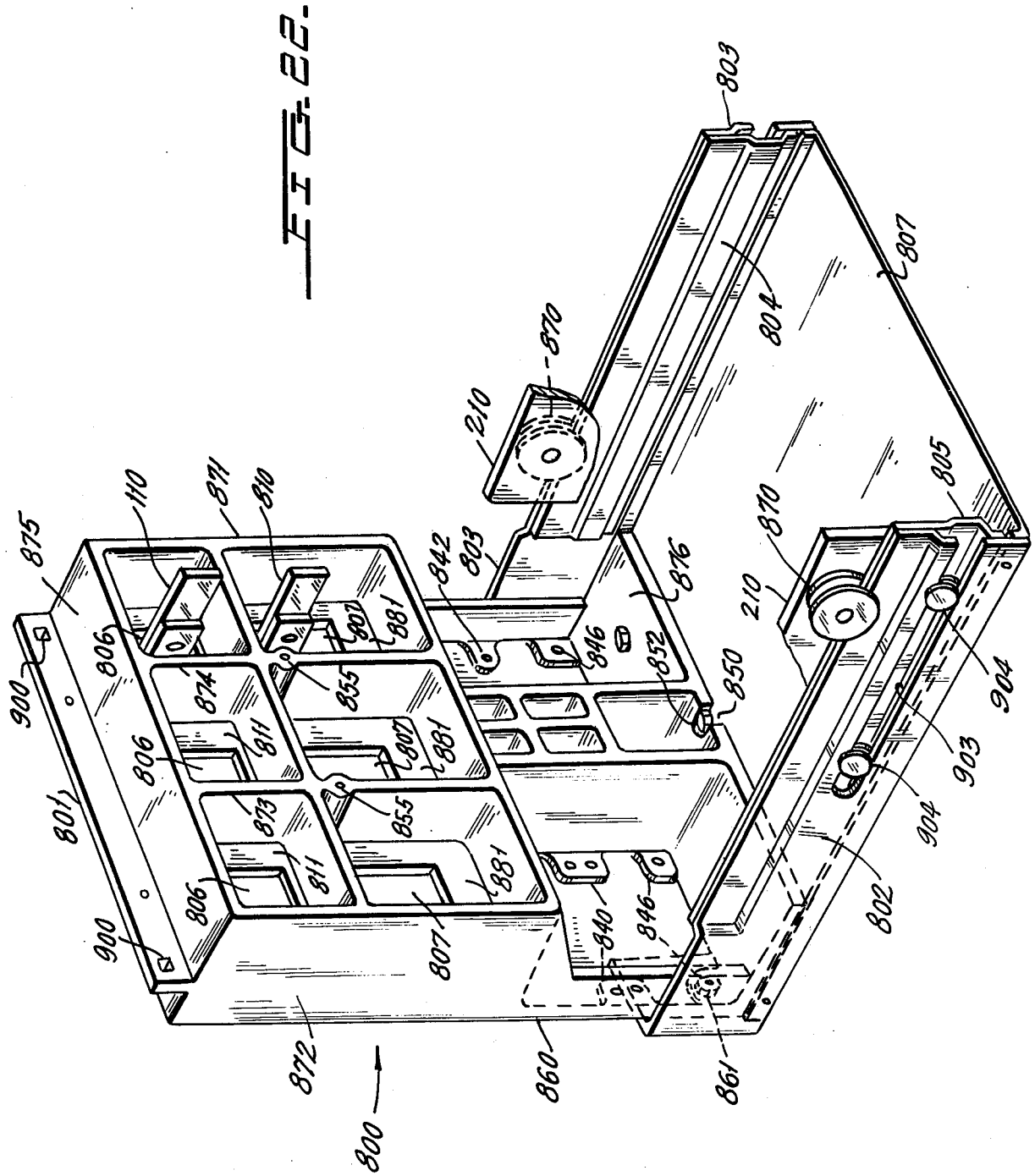

DRAW OUT CIRCUIT BREAKER ASSEMBLY

CROSS-REFERENCES TO RELATED APPLICATIONS

The present invention relates to circuit breakers and more particularly to a cradle utilized in the switchboard for supporting a draw out circuit breaker of the type shown in applications Ser. Nos. 735,017, 734,955, and 735,040 now U.S. Pat. Nos. 4,146,764, 4,101,744 and 4,146,765, respectively assigned to the assignee of the present application.

BACKGROUND OF THE INVENTION

In the construction and operation of circuit breakers which are to be utilized in switchboards, the circuit breaker is frequently mounted on a carrier or other device so that it may be mounted in an appropriate cubicle in the switchboard. It may then be racked in to full connection with the buses at the rear of the cubicle and racked out to various positions including a test position, a full disconnect position and a position in which it may be removed from the switchboard.

The device utilized in the switchboard with which the circuit breaker racking mechanism cooperates and on which the circuit breaker is supported is known as a cradle. The cradle provides all of the stationary parts necessary for cooperation with the draw out circuit breaker.

SUMMARY OF THE INVENTION

The present invention has for its object the formation of a cradle as an assembled unit which can be bolted into any switchboard and maintain its dimensional integrity.

Another object of the present invention is the provision of an insulated base for supporting all primary terminals, the forward part of the terminal providing a connecting stab for the separable contact fingers on the circuit breaker and the rear part of the terminal providing means for readily making bus connections.

As is well known, in a draw out circuit breaker, particularly of the type described and shown in the above-mentioned applications, the rear of the circuit breaker is provided with contact fingers which will make contact with stationary buses in the cubicle. The stationary buses are provided with a connecting stab or extension so that the contact fingers of the circuit breaker may make appropriate electrical engagement for current-carrying purposes.

Another object of the present invention and one of the purposes of the cradle is to provide a fixed track for rolling the circuit breaker in or out. The fixed track also serves as the main structural member for the cradle in the present invention and the fixed track also is provided with captive, extendible, or roll-out sections to make provision for rolling the breaker outside of the compartment.

A further object of the present invention is the provision on the cradle of secondary disconnect contacts for all control circuits as well as auxiliary switches operated by the circuit breaker mechanism and position indicator switches operated by the circuit breaker truck to indicate that the circuit breaker is either in the fully connected test or disconnect positions or in a position ready to be rolled out. All of the components may be prewired and precisely positioned preparatory to bolting the cradle into the switchboard.

A further object of the present invention is to provide mechanical blocks which, when the circuit breaker is connected, will automatically prevent the circuit breaker from being moved unless appropriate preliminary steps already described in connection with the above-mentioned applications are performed.

A further object of the present invention is the provision of mechanical interlocking between circuit breakers so that the circuit breakers in the cubicles may operate only under prescribed conditions.

A further object of the present invention is to provide an anchor point for the racking system so that the circuit breaker may be moved in or out with reference to this anchor point. In other words, if the racking mechanism of the circuit breaker is to be utilized to move the circuit breaker fully into the connected position and out of the connected position, the cradle of the present invention provides the anchor point which may be engaged by an element on the circuit breaker itself in order to provide the means for pulling the breaker fully into connected position on the track or for racking the breaker out as required.

A further object of the present invention is to provide an automatic ground connection such that the frame of the circuit breaker which is exposed to operating personnel will always be grounded, this grounding being performed by reason of the fact the circuit breaker is riding on the cradle.

A further object of the present invention is to provide a cradle which will provide appropriate mountings for current transformers and contain wiring provisions for the same.

A further object of the present invention is to provide an easily boltable connection between the insulated current-carrying assembly and the cradle base. In this way, the current-carrying assembly can be packaged inside the cradle base for shipment thereby saving substantial shipping space.

A further object of the present invention is the provision of interference blocks which may be used to allow only certain breakers to enter specific compartments, the breakers being keyed to the particular blocks.

BRIEF DESCRIPTION OF THE DRAWINGS

The foregoing and many other objects of the present invention will become apparent from the following description and drawings in which:

FIG. 1 is a side view of a circuit breaker of the "schematic" type which will be carried on a racking support which, in turn, will be mounted on the cradle and is closely related to the circuit breaker described in the aforementioned pending applications.

FIG. 2 is a detailed side view of the circuit breaker which may be used in connection with the present invention.

FIG. 3 is a top view of a circuit breaker which may be used in connection with the present invention showing the circuit breaker in fully racked-in position.

FIG. 4 is an enlarged top showing the upper contacts of the circuit breaker which may be used in connection with the cradle of the present invention and the manner of their connection in the cubicle to the current supply.

FIG. 5 is a cross-sectional view showing the lower contact terminals and their relationship to the cubicle and the cradle and showing also the rollers of the circuit breaker which will ride on the track in the cradle.

FIG. 6 is a side view of the cradle showing the circuit breaker mounted in place in the cubicle in which the cradle is contained.

FIG. 7 is a detailed view corresponding to that of FIG. 6 but also showing the side of the cradle and the relationship of the various parts of the cradle.

FIG. 8 is a cross-sectional view taken from line 8—8 of FIG. 7 looking in the direction of the arrows.

FIG. 9 is a front view of the cradle molding assembly which actually supports the stationary disconnect contact elements within the cubicle as well as the auxiliary switches and other elements of the structure of the cradle.

FIG. 10 is a view in section taken from line 10—10 of FIG. 9 looking in the direction of the arrows and showing the upper connection terminals supported in the cradle.

FIG. 11 is a partial view of the rear of the cradle of FIGS. 9 and 10 showing the mounting of the switchboard leads.

FIG. 12 is a view of the bottom portion of the cradle taken from line 12—12 of FIG. 7 looking in the direction of the arrows.

FIG. 13 is a view taken from line 13—13 of FIG. 7 corresponding to that of FIG. 12 showing additional parts of the cradle.

FIG. 14 is a view partly in cross-section taken from line 14—14 of FIG. 12 looking in the direction of the arrows and showing the secondary control contacts and the various positions which they may assume.

FIG. 15 is a view corresponding essentially to that of FIG. 9, being a front view of the cradle molding subassembly itself without the parts of FIG. 9 mounted thereon.

FIG. 15a is the cross-sectional view taken on line 15a—15a of FIG. 15.

FIG. 16 is a front view corresponding to that of FIG. 15 of the cradle molding subassembly showing a larger cradle and a larger molding structure available for larger sizes of circuit breakers utilizing nevertheless the same structural elements as shown in the prior Figures.

FIG. 16a is a cross-sectional view taken from line 16a—16a of FIG. 16 looking in the direction of the arrows.

FIG. 17 is a diagrammatic view of the breaker position indicator switch which is used to indicate the various positions of the breaker within the cubicle, fully racked-in and test position.

FIG. 18 is an enlarged view of a portion of the views of FIG. 8 showing the circuit breaker indicator switch which is connected as hereinafter described to the circuit breaker jackshaft to indicate the condition of the circuit breaker contacts.

FIG. 19 is a side view of the indicator switch of FIG. 18.

FIG. 20 is an enlarged view of the left-hand end of the floor of the cubicle shown in FIGS. 12 and 13.

FIG. 21 is a side view of the structure of FIG. 20.

FIG. 22 is a schematic view in perspective showing how the rail structure of the cradle forms the structural base for the entire cradle which is itself secured in the cubicle in order to receive the circuit breaker.

CIRCUIT BREAKER STRUCTURE

Referring first to FIGS. 1-5, there is here shown essentially the circuit breaker previously described in the prior applications Ser. Nos. 735,017, 734,955 and 735,040, now U.S. Pat. Nos. 4,146,764, 4,101,744 and 4,146,765, respectively, all filed Oct. 12, 1976, all previously referred to. This circuit breaker is also mounted on the molded support described in application Ser. No. 869,589, filed Jan. 16, 1978, filed simultaneously herewith and more specifically described therein, the molded support being part of the circuit breaker itself, and providing the means for positioning and carrying the various parts of the circuit breaker so that they may be moved into the cubicle and into the cradle of the present invention.

The circuit breaker also is provided with the arc extinguishing devices more specifically described in copending application Ser. No. 869,858, filed Jan. 16, 1978, filed simultaneously herewith; these arc extinguishing devices are also described in connection with the molded circuit breaker support described in application Ser. No. 869,858, filed Jan. 16, 1978.

A full understanding of the present invention requires a brief description of the circuit breaker itself shown in FIGS. 1 to 5. Referring first to FIG. 1, a circuit breaker is here shown schematically in the position in which the contacts are closed and the closing springs are fully discharged. The type of circuit breaker which is here referred to is fully described in the copending applications above referred to. The circuit breaker there described is a circuit breaker in which a plurality of closing springs are utilized to drive the circuit breaker from an open position to a closed position. Accordingly, a motor is provided which will first charge the springs; the springs are latched in the charged position. When the contacts of the circuit breaker are open and are later to be closed, the latch which retains the closing springs in the charged position is released so that the springs may operate directly to close the contacts to the circuit breaker. After the contacts are closed, the springs may be recharged.

Since the invention is directed to the cradle structure, the specific spring charging structure and racking structure need not be specifically described and the contact operating structure need be described to the extent only that it is necessary to understand the relationship of the structure of the circuit breaker to the cradle. The shaft 25 is driven counterclockwise in the direction indicated by the arrow in FIG. 1 in order to charge the closing springs. For this purpose, an appropriate connection from a motor or handle is made to the shaft 25 to perform the operation. On the closing of the circuit breaker, an appropriate latch as described in the said prior applications is set to prop the basic support members while nevertheless leaving the circuit breaker trip-free but arranging the circuit breaker so that it will not accidentally be opened by operation of the closing springs upon recharge. The closing spring can be discharged only when the breaker is open.

The latch member 60 carried by shaft 25 is driven onto the prop latch 61 in a position not shown in FIG. 1 (but shown in FIG. 5b of the prior application). The prop latch 61 is pivotally mounted on the stationary pivot 62 and is provided with the latch roller 63 which is supported by the closing latch 64. The closing latch 64 is an extension of the bell crank lever 65 which is pivoted on the stationary pivot 66. This latch structure provides a support for retaining the springs in charged condition while the contacts are open and after the contacts are closed preparatory to another closing operation.

In FIG. 1, the structure is shown in the condition in which the contacts are closed and the springs have been discharged; in other words, the closing latch 64 has been rotated so that it no longer supports the latch roller 63 and thus, no longer supports the prop latch 61 and thereby no longer supports the latch member 60 on the shaft 25. Latch member 60 has now rotated clockwise to the position where the springs have been discharged in order to close the circuit breaker. Therefore, the position shown in FIG. 1 is one in which the circuit breaker is closed and the springs are fully discharged.

Upon the discharge of the closing springs, which is the condition shown in FIG. 1, the shaft 25 is rotated to the position shown in FIG. 1, and the first cam 26 operates through roller 45 to rotate the third closing cam 46 in a counterclockwise direction around its pivot 47. The roller 45 supported on the arm 48 which is supported on the pivot 49 is a part of the cam 46. The end of the third closing cam 46 opposite to that which is engaged by the roller 45 is provided with a recess 50 which engages an additional roller related only to the spring closing operation, and described in the prior applications and need not be described here.

The second closing cam 70 is stationarily pivoted on the pivot 71 and is provided with the latch roller 72 which bears against the tripping latch 73 rotatably mounted on the pivot 74 and spring biased toward the position shown in FIG. 1. Thus, as the springs are charged, shaft 25 is rotated counterclockwise until member 60 is blocked by the prop latch 61. Member 60 is in a position 180° opposite to the position shown in FIG. 1.

The prop latch 61 is in turn supported by the engagement of the latch roller 63 with the closing latch 64. This, again, is the condition when the closing springs are fully charged.

In the condition of the circuit breaker with the contacts open and the springs charged, recess 26a of cam 26 on shaft 25 engages the roller 45. The roller 45 is driven up onto the outer perimeter of cam 26 thereby raising the cam 46 around its pivot 47 and following a path defined by the cam 26 and the second closing cam 70. The engagement of latch 73 with latch roller 72 establishes the position of cam member 70 and the track for roller 45 so that roller 45 is guided in a path which will lift the cam 46 around the pin 47. Link 21 connected at 22 to the lever 46 is connected at 23 to the bell crank arm 24 secured on the jack shaft 20. The opposite end of bell crank arm 24 is connected by pin 30 to the extension 31 of the contact arm 80. It will here be noted that the contact arm 80 is maintained in the closed position by the latch 73 engaging the roller 72 and positioning the roller 45 and arm 48 so that the lever 46 is maintained in the raised position to drive the bell crank lever 24 counterclockwise in the direction to maintain the contact arm 80 closed.

The contact elements forming the contacts 101, 102, 103 are arranged so that the main stationary contact elements 101 and the main disconnect contact elements 102, 103 are identical in construction thereby eliminating the total number of different parts which must be fabricated in order to construct the circuit breaker.

In the instance illustrated in FIGS. 1 and 2, the stationary contacts 101 are shown with three pairs of jaws while the disconnect contacts 102, 103 are shown with five pairs of jaws. The number of pairs of jaws utilized for the contact elements depends on the current rating and the desired current carrying capacity.

Should a larger capacity breaker be required, such as 2000 ampere breaker, then two sets of upper and lower disconnect contacts having five pairs of jaws each may be used for the purpose.

It should be noted in FIGS. 3, 4 and 5 while circuit breakers of different capacities are shown mounted in the three-pole structure, in any particular use, the circuit breaker structures for each of the poles are of the same capacity. The showing of circuit breakers of three different capacities mounted in the three different sections of a single three-pole circuit breaker in FIGS. 3, 4 and 5, is for the purpose of demonstrating that the same housing and the same structure may be utilized for circuit breakers of varying capacity, both in their operating capacity such as 800 ampere, 1600 ampere, 2000 ampere breakers, as well as in current interrupting capacity.

As seen particularly in FIG. 4, current enters through the upper back connection stud 110 in the cubicle or stationary part of the circuit breaker housing. In the case of a higher capacity circuit breaker, where a plurality of sets of disconnect contacts can be required, the back connection structure or terminal may be modified as shown at 110a, 110b to provide a double path for the contacts. Similarly, for an even larger capacity circuit breaker carried by the same structure, a somewhat heavier back connection terminal or stud 110c, 110d may be utilized. Current then passes (FIGS. 1 and 2) through the disconnect contacts 102 to the stationary contact support structure 112, then through the stationary contacts 101 and the stationary arcing contact 114 to the movable contact arm or contact bridge 32 which is pivotally mounted at the pivot 33 on the lower connector and contact mounting structure 116. Current then passes through the lower disconnect contacts 103 to the stationary terminal or stud 110 in the housing.

The disconnect contacts 102, 103 and the stationary contacts 101 are so arranged they they are identical in construction so that each member of the pairs of jaws forming the plurality of contact elements is identical. This, therefore, simplifies the fabrication of the circuit breaker elements. Each of the individual elements 120 forming the various contacts 101, 102, 103 as shown in FIGS. 1, 2, 3, and 4 is composed of a substantially elongated member having from the side view (visible more clearly in FIGS. 1 and 2), a substantially elongated rectangular appearance, and, from the top or edge view, seen more particularly in FIGS. 3 and 4, a plurality of curvatures designed to provide appropriate hinging contact pressure on the contact surfaces. Each of the contact elements 120 (FIG. 4) is provided with a separable contact surface 121 adjacent the end 122 thereof. The end 122 thereof bends or flares flatly away from the contact surface 121 thereby providing a pivot with respect to which the contact members 120 will move. With respect to the disconnect contacts at the rear of the circuit breaker, the pair of members 120 facing each other also have their contact surfaces 121 facing each other and the flare at the end 122 provides easy entry of the stationary cubicle stud 110c between the contacts surfaces 121 of the respective contacts elements 120. At the stationary circuit breaker contacts 101, 101, the elements 120 are reversed so that the contact surface 121 of each of them is directed toward the blades 125, 125a of the movable bridge or contact 32. This, again, provides easy access for the contact elements 125, 125a through the flared section formed by the elements 122, 122 of the stationary contact elements 120 between the said contacts.

The members 120 extend in one direction on the circuit breaker toward the rear of the circuit breaker for easy connection to the stationary cubicle contacts 110 while they extend in the opposite direction on the circuit breaker toward the front of the circuit breaker for easy connection to the movable contact structure 32.

Each of the members 120 is provided with an opening 130, 130 through which a bolt 131 may be passed and an appropriate nut 132 on the bolt 131 compresses a spring 133 in order to provide appropriate contact pressure between two matching members 120 the contact surfaces 121, 121, each of which is being driven toward the other. The bolt 131 also serves to mount the contact structure for the stationary contact of the circuit breaker on the connection member or circuit breaker internal bus 112; opening 135 is provided at the forward or right-hand end of the circuit breaker internal bus 112 (see FIG. 5), so that the bolt 131 may pass therethrough and secure the contacts in place. Similarly, at the rear end of the internal bus 112 of the circuit breaker, an opening 136 is provided for the rear bolt 131 in order to secure the contact members for the disconnect contacts 102 in place. Each of the contact members 120 is provided with an outwardly directed bend or boss 140 at the point where the bolt 131 passes through the same; the contact elements 120 are so curved that the compression spring between them forces the contact sections 121 toward each other and also forces the stationary contact sections 142, 142 toward each other.

The upper stationary internal bus 112 of the circuit breaker for instance is thus provided with the rear disconnect contact structure 103 by the engagement of contact surfaces 142, 142 of the facing contact members 120, 120 with the internal circuit breaker bus 112.

The contact members 120, 120 being driven toward each other by the compression spring 133 not only drive the contact surfaces 142, 142 into engagement with the internal circuit breaker bus 112, but also drive the contact surfaces 121, 121 of the contacts 120 toward each other in order to establish appropriate contact with the stationary or cubicle stud 110.

The flare provided by the bending out of the ends 122 at each end makes it possible when the circuit breaker is inserted into the cubicle for the contact surfaces 121, 121 of the contact 120 facing toward the rear to be spread apart by the chamfered end 150 of the stationary stud 110 to enter upon the surface of the stud 110 on each side and the compression spring establishes appropriate contact.

For ease in assembly of the circuit breaker contacts and in order to avoid misalignment during assembly, as seen particularly in FIGS. 1, 2 and 4, the contact members 120 are notched at their rear or "stationary" end at the notch 152 to indicate readily which part of the contact structure is to be stationarily and permanently secured to the contact carrying member.

ARC EXTINCTION

In addition to the stationary contacts 101 described in connection with FIGS. 1, 2 and 4, the circuit breaker upper connection bus 112 carries an additional pair of arcing contacts 160 which engage with the arcing contact section 161 of the contact bridging arm 32. This arcing contact section is more readily seen in the upper right-hand and center poles of FIG. 4 wherein the stationary arcing contact 160 operates in substantially the same manner as one of the elements 120 of the main contact 101 or disconnect contacts 102, 103, except that it is larger and is made of a material which is better adapted to resist the arc.

The stationary arcing contact 160 comprises two identical contact members 162, 162, which are arranged to face each other and have at the end thereof, facing the movable contact arm, arcing contact elements 163, 164. The opposite end of the arcing contact members 162, 162 are provided with contact surfaces 165, 165, which engage the upper internal bus 112 of the circuit breaker leading to the upper disconnect contact element 102.

An opening in the upper 167 internal bus 112 of the circuit breaker carries the bolt 170 which passes also through appropriate openings in the arcing contact elements 162, 162, and positions compression springs 171, 172 on each side against the arcing contact elements 162, 162, thereby driving them toward each other and against the movable arcing contact 161, 161, carried by the contact bridging arm 80. The length of the stationary arcing contact 160, and the arrangement of parts is such that, when the movable contact arm 32 moves from the solid line position of FIG. 1 to the dotted line position of FIG. 1, current is transferred from the stationary contact 101 to the stationary arcing contact 160. This is so because the separation of the movable contact arm 32 and the stationary circuit breaker contact 101 occurs first.

The arc is then drawn between the arcing contact elements 163 and 161 and is then moved up appropriately into the arc chute 181 where it is extinguished.

In FIG. 2, the circuit breaker mechanism including the shaft 20 which operates the moving contact arm 32, is shown as well as the operating link 21. There is also indicated at 200 the elements related to the spring charging mechanism for the charging of the springs 201, 201. No specific description of this structure is herein contained because it is described in the above-mentioned prior pending applications.

THE CIRCUIT BREAKER CRADLE

The cradle of the present invention and its operation may be understood from FIG. 22, as well as FIGS. 6, 7 and 9. The cradle 800 as shown in these Figures comprises a basic support molding 801 and the stationary side rails 802, 803 which constitute the fixed track and which are connected to and support the extendable track 804, 805, on each side. The molding 801 is provided with a set of openings 806, 806, for the upper stationary contacts 110, and a set of openings 807, 807 for the lower stationary contacts 810, as shown in FIGS. 9 and 10.

The upper contact members 110 are secured to the portions 811, 811, surrounding each of the openings 806 by bolts 812, which go through the section 811 of the molding 801 to the L-shaped strap 813. The L-shaped strap 813 is connected by bolt 814 of the connector 110. The connector 110 is provided as a U-shaped structure at 815 which is connected by the bolt and nut arrangement 816 to the switchboard lead 817.

In FIGS. 9 and 10, various types of such connections are shown. Thus, the connection shown on the right-hand side and thus far described is the connection which is utilized for smaller circuit breakers, say on the order of 800 amperes. It will be kept in mind that any one cubicle and any one circuit breaker inserted in that cubicle will be for a single particular rating, such as 800 amperes, 600 amperes, or 2,000 amperes. The showing, however, is that the same cradle molding subassembly 801 may be utilized for these different ratings of circuit breakers.

Where the circuit breaker cradle is to be connected in a 1,600 ampere circuit breaker, then that is shown at the connector 110a in the center of FIGS. 9 and 10. An elongated strap 813a is used connected by the bolt and nut arrangement 812a to the particular wall 811 defining the opening 806. The strap 813a together with member 820 is a continuous piece of metal forming one half of the terminal connection 110a; the horizontal run 822 forms the other half of the terminal. These terminal sections are connected by the bolts 825, 825 (see also FIG. 11) to the switchboard leads 826, 827. In this case because the double lead capacity is required, it will be noted that the back connection stud 110a need be no larger than the back connection stud 110, owing to the fact that the conduction section doubles immediately beyond the current transfer point.

The connections from the connecting stud 110a in the cubicle to the buses or other devices in the switchboard utilizing the members 813a, 820, 821, 822, and the switchboard leads 826 and 827 double the capacity that is used on the right-hand side of FIG. 11. Where a still larger circuit breaker should be used having a current-carrying capacity in the order of 2,000 amperes, it is desirable to have a double back connection stud consisting of the elements 110b and 110c. Here, the elements 110b and 110c are parallel with each other, and are spaced by the spacer 830. The connectors 110b and 110c are extensions of the strap members 821b, 822b and 813a, 820b, respectively, which, in turn, are quite similar to the strap members utilized in the middle section with respect to FIG. 10. The connections to the switchboard leads 827a, 826a, may be similar and may be effected through the bolt and nut arrangement 825a, so that the same thickness of metal back connection studs 110b and 110c may be used for the similar connector in the 2,000 ampere structure. Nevertheless, additional current-carrying capacity is provided by the utilization of two such connectors and by appropriately proportioning the switchboard leads 826a, 827a, and the associated elements. Thus, the same molding may be utilized for circuit breakers of a plurality of sizes.

The three poles of a single circuit breaker would be utilized for a single rating. The poles of the circuit breakers of FIGS. 9 and 10 are not intended to be regarded as poles of a different rating. FIGS. 9 and 10 are utilized to show that the single cradle molding assembly 801 may be utilized for breakers of 800 amperes capacity in which case the structure shown at the right-hand pole of FIGS. 9 and 10 would be used for all three poles. It may also be utilized for circuit breakers of 1,600 amperes rating in which case, preferably, the structure shown at the middle pole of FIGS. 9 and 10 would be utilized. It may also be used for circuit breakers of 2,000 amperes rating in which case the left hand pole stud structure is utilized for all three poles.

In FIG. 9, the description as previously directed to the upper poles of the back connection studs is also applicable to the arrangements for the lower pole studs 810, 810a, 810b, 810c, extending through the openings 807; in each case these will be identical, and, therefore, no further detailed description is needed. For this reason, the parts in FIG. 9 showing the lower poles have been given the same reference numbers as the parts in FIGS. 9 and 10 showing the upper poles.

The molding 801 of FIG. 15 is also provided with bosses or supports 840, 840, for supporting secondary disconnect contact structures 841 (see, also FIG. 9). The additional bosses 842, 842, are provided for supporting additional secondary disconnect contact structures 843. These additional secondary structures may be utilized for control of various functions as is well known in drawout circuit breakers. The molding may also carry a group of secondary control contacts 845 secured on appropriate bosses 846, 846.

The molding is also supplied with a recess 850 to engage (FIG. 9) a hold-down stud 851 in the breaker cubicle, being secured thereto by the bolt 852 so that the cradle molding 801 is accurately positioned in the compartment. Appropriate additional means may be provided for positioning the cradle 800 in the compartment as shown in FIG. 15. Appropriate openings 900, 900 may be provided in the cradle molding extensions for securing the cradle to the back wall of the compartment.

Openings 855, 855 in molding 801 will accept inserts 856 (FIG. 15a) which provide an anchor point for mounting current transformers on studs 810, 810a, 810b, 810c.

As shown in FIG. 22, and as is also indicated in FIG. 12, the rails 802, 803 extend rearwardly of the cradle molding 801 and are bent at right angles to engage a rear wall 860 of the cradle molding 801 to which they may then be secured by a plurality of bolts 861. The rails 802 and the cradle molding 801 are thus integrated to form a rigid frame which supports all the parts of the cradle and, when the circuit breaker is in the cubicle, supports also the circuit breaker by reason of the fact that the rollers 870 of the circuit breaker ride on the rails 802, and at certain times on their extension 805.

The cradle molding 801 is provided with a pair of forwardly projecting front walls 871, 872, and a pair of intermediate forwardly projecting walls 873 and 874. The walls 873 and 874 form interphase barriers within the circuit breaker compartment or cubicle. The additional side walls 871 and 872 serve to strengthen and rigidify the cradle molding. For the same reason, the cradle molding 801 is provided with the top and bottom walls 875 and 876 which, while not strictly necessary for electrical purposes, serves to provide additional reinforcement for the structure.

In essence, therefore, the cradle molding 801 is a three-part receptacle in which each of the three sections is fully enclosed on the top, the bottom, and the sides, and open only at the front to permit engagement of the back connection contacts 110 or 810 with the appropriate contacts of the circuit breaker.

FIGS. 16 and 16a show a modified form 801a of the cradle 801 of FIGS. 15 and 22 in which circuit breakers of larger capacity from 2,500 through 3,200 to 4,200 amperes may be accommodated. In this case, the cradle molding subassembly 801a is provided with multiple pairs of openings 806a, 806a, separated by walls 873a, 874a, as well as multiple openings 807a, 807a. Each adjacent pair of openings may be utilized to receive stationary contact structures such as that shown in FIG. 10 although, if necessary, of larger size and each adjacent pair of openings 806a, 806a, and 807a, 807a, may be utilized to operate in connection with a single pole of the circuit breaker. The other elements of the cradle structure 801a of FIG. 16 may be utilized in a manner similar to that of the cradle structure 801 of FIG. 15 for supporting various auxiliary and test switches as may be required in a manner well known. The essential concept here is that while the cradle molding of FIG. 15 may be utilized for smaller circuit breakers ranging from 800 amperes through 1,600 amperes up to 2,000 amperes, the cradle molding of FIG. 16 may be used for higher ratings as above pointed out, providing for additional contact structure for this purpose. The six sets of openings will thus be used for three poles and each set of poles may also be provided with variations in the back connection contact arrangements such as that shown in FIG. 10, but obviously of larger size. Here, also, in the FIG. 16 structure, openings 855, 855, will be provided as seen in FIG. 16 and 16a in order to provide an anchor point for mounting current transformers. The other structures will be essentially the same and therefore have been given the same reference numbers in FIG. 16 as in FIG. 15.

The current transformer 880 shown in FIG. 7 for the particular cubicle may be mounted in the area 881, FIG. 15 of the cradle molding subassembly 801, and the corresponding area of the larger subassembly shown in FIG. 16. In FIG. 8 and in the cross-sectional view at each of the lower ends of FIG. 9, the arrangement of the main rails 802, 803, and the sliding rails 804, 805, are shown. The sliding rails are extensible outside the cubicle when the cubicle is opened. The circuit breaker when it is entirely within the cubicle rides on the rails 803, 802. When, however, the circuit breaker is to be withdrawn from the housing, the rails 804, 805, slide out frrom the rails 803, 802, so that the circuit breaker may be withdrawn from the housing without necessarily using a crane or hoist or other support for the circuit breaker while it is being moved clear of the housing. When it is moved clear of the housing on the extension rails 804, 805, then it may be removed in any suitable manner and of course replaced in a reverse operation.

When the circuit breaker is in the housing, it becomes desirable that an external indication be provided for the position of the circuit breaker contacts to indicate whether they are open or closed. In FIG. 7, a structure is shown for achieving this result. The circuit breaker is provided with an actuator 890 connected to the pin 891 which in turn is connected by a link 891a to the circuit breaker jackshaft 20. The actuator 890 is engaged with the rocker arm 892 which is fixed in the cradle on the pivot 893. The actuator 890 is actually engaged with the rocker arm 892 in both the test and connected position of the circuit breaker. If the circuit breaker is closed during this engagement, the rocker arm 892 rotates clockwise and the open-ended slot 894 drives the operating arm 895 of the switch 896 (see FIGS. 18 and 19). It will be noted that the actuating arm 890 has a right angle bend at the bottom and a channel extension 891 which slides onto the end of the rocker arm 892. Since the circuit breaker is inserted into the cubicle with the contacts open and therefore the actuator arm 890 is in the down position, the channel extension 900 will engage the end 901 of the rocker arm 892. Thus, when the circuit breaker is inserted into the cubicle, the end of channel 900 slides onto and engages the end 901 of the rocker arm 892.

The circuit breaker is shown in FIG. 7 in solid lines in the open or tripped position and in dotted lines in the closed position. It will be seen that as the jackshaft 20 is rotated to move the bridging contact 32 to engage the stationary contact of the circuit breaker, the actuating arm 890 will be raised and the channel extension 900 thereof will lift the end 901 of the cam 892 which pivots on pivot 893. The engagement of slotted end 894 of the rocker arm 892 with the lever 895 on the switch 896 will operate the switch to indicate that the circuit breaker has been moved to the dotted line or closed position.

As is well known, the circuit breaker is tripped before it is withdrawn from engagement with the back connection studs; this causes the actuator arm 890 to move downwardly thereby raising the slotted end 894 of the rocker arm 892 and thereby moving the arm 895 of the switch 896 from the closed position to the open position. In this way, the switch 896 is operated directly by the circuit breaker but is wired out as part of the switchboard thereby providing an indication of the condition of the circuit breaker. The length of the channel extensions 891 of the actuating arm 890 of the circuit breaker makes it possible to move the circuit breaker to the test position while still permitting the actuating arm 890 to operate the indicator switch 896. The extension rails 804, 805, ride on side rails 803, 802, as clearly seen in the end view of FIG. 9. The recesses 904 in extension rails 804, 805, ride on pins 903 supporting the side rails 802, 803. In addition, in any drawout circuit breaker there must be an indication of the position of the circuit breaker within the cubicle. A projecting slide actuator 910 (FIG. 17) will operate in either the test or connected position depending on its length. As the circuit breaker structure 10 moves into either of these positions, it pushes the slide actuator 910 horizontaly in its guides 911 and a cam slot 912 drives the operating arm 913 of the position indicating switch 914 thereby in effect rotating the crank arm 913 of the operating position indicating switch 914.

A tension spring 915 operates as a reset spring to return all the moving parts when the circuit breaker is removed. The cam slot 912 is made sufficiently long to accommodate any desired amount of over travel. With the circuit breaker in the connected position (see FIG. 6), the stationary track 802 captures the rear wheel 870 of the circuit breaker in the hook configuration 920 (FIG. 6).

FIG. 14 shows the secondary control contacts.

Molding 1000 supports the stationary assembly of these contacts and attaches to points 840, 842 or 846 of FIG. 15.

The fixed contact strip 1001 is interlocked into molding 1000 and retained by screw 1002.

Molding 1003 is the moving part of the assembly and is attached to the circuit breaker at end 1004. It is shown in the fully connected position.

Contact retaining strip 1005 is interlocked into molding 1003 and supports moving contact member 1006. Moving contact member 1006 is retained on pivot pin 1007 and projection 1008 when the contact is disengaged (dot-dash position). Contact spring 1009 urges the contact 1006 in a counterclockwise direction about pivot pin 1007.

During insertion of the circuit breaker into the cradle the moving contact assembly 1003 travels from right to left with respect to FIG. 14. Contact member 1006 is shown in a disconnect position at 1010 (dot-dash position) and in a test position at 1011 (dot-dash position). During this travel it engages a entry ramp on fixed contact strip 1001 and slides along the fixed contact strip 1001 with contact spring 1009 supplying pressure because contact 1006 has been deflected into the solid line position.

Current flow is from wire lugs 1012 into fixed contact strip 1001, through the contact point between 1001 and 1006, through pivot pin 1007, through the joint between pivot pin 1007 and strip 1005 and finally out of wire lugs 1013.

Projection 921 (FIG. 9) of the circuit breaker extends beneath the corresponding projection 922 on the track to act as a hold-down for the circuit breaker to keep it from moving upwardly as the mechanism operates it horizontally. Fixed pivot 893 may also carry a second crank arm 925 (FIG. 7) which is operated as well by the circuit breaker actuating arm 890 when the circuit breaker is in the connected position within the cubicle. Rocker crank arm 925 may be coupled to a flexible cable 926 which runs to another circuit breaker compartment for interlocking purposes. Also, a second flexible cable 936 may be brought in from other compartments and coupled to the trip arm 931 which has a fixed pivot 932. Also connected to the fixed pivot pin 932 is a tripper piece 933 which will trip the circuit breaker when it presses upward on a member 934 which is part of the circuit breaker and coupled directly to the circuit breaker trip latch 73. Thus, two breakers may be interlocked by the two cables so that only one may be closed at a time. Likewise, other interlocks may couple to member 931 at the point 940 to hold the breaker trip free under predetermined conditions.

The ground contact mechanism is seen in FIG. 12. The circuit breaker mechanism side plate 2000 has bolted to it ground contact fingers 2001, 2001. These engage a fixed stab in the cradle 2002 which terminates at point 2003 where a common ground bus may be attached in the switchboard.

The racking system engagement is also shown in FIG. 12. Racking plate 2003 is anchored to molding 801 by bolts 2004. At the forward end is located an open slot (open end upward) 2005. When the circuit breaker is rolled into the compartment pin 2006 on the racking mechanism engages the back of slot 2005. Rotation of the racking mechanism crank rotates members 2007, 2007, which carry pin 2006, downward into full engagement with slot 2005. Thereafter continued rotation moves the circuit breaker with respect to fixed slot 2005.

The current transformers are shown in FIG. 7. The current transformers 880 are assembled into pocket 881 of molding 801. When the circuit breaker is removed from its compartment the current transformers are readily accessible for assembly or removal over current stud 810.

The current transformers are retained by a strip of insulating material 3000 which is in turn retained to the molding 801 by bolts 3001.

One of the essential elements of the invention is that the interlocking provisions are carried by the cradle within the cubicle and no special parts need be attached to the circuit breaker. Any breaker will thus fit the interlock system provided it has the actuating arm 890.

Various elements of the circuit breaker which are utilized in the structure are described in FIGS. 1 to 5, and need no further description here, particularly since they are also covered in detail in the application Ser. Nos. 869,857, 869,858, and 869,589, all filed Jan. 16, 1978. The operating springs which effect the closing of the circuit and the method for recharging the springs constitute no part of the present invention, although it constitutes one of the essential elements of the applications Ser. Nos. 735,017, 734,955 now Pat. No. 4,101,744 and 735,040, filed Oct. 22, 1976, previously referred to.

Although a preferred embodiment of this invention has been described, many variations and modifications will now be apparent to those skilled in the art, and it is therefore preferred that the instant invention be limited not by the specific disclosure herein but only by the appended claims.

I claim:

1. In a switchboard having a cubicle for a draw-out circuit breaker; said cubicle having a plurality of buses at the rear thereof, side walls, a bottom wall, a front opening and means for closing said front opening; a circuit breaker insertable in said cubicle movable therein toward and away from the rear thereof and removable from said cubicle; said circuit breaker including movable and stationary contacts and means for closing and opening said contacts; said circuit breaker also having sets of upper and lower disconnect contacts extending from the portion of the circuit breaker directed toward the rear of the cubicle when the circuit breaker is inserted in the cubicle; racking means on said circuit breaker for cooperating in moving said circuit breaker in said cubicle toward and away from the rear thereof; and means on said circuit breaker for cooperating with and riding on a pair of tracks;

a cradle for said cubicle;

a pair of parallel fixed tracks forming the principal structural members of said cradle;

said tracks extending parallel to and substantially adjacent said side walls of said cubicle from an area substantially adjacent said rear of said cubicle to said front opening of said cubicle;

said cradle having a bottom wall connecting said tracks;

a vertical support wall of insulating material at the rear of said cradle supported between and connected to said tracks;

means for securing said cradle in said cubicle;

upper and lower sets of stationary disconnect contacts;

openings in said vertical support wall of said cradle receiving and supporting said upper and lower stationary disconnect contacts; and means for connecting said stationary disconnect contacts to their respective buses; and means connected to said vertical support wall engageable with said racking means of said circuit breaker and providing a stationary anchor with respect to which the racking means of said circuit breaker may operate to draw the circuit breaker into the cubicle and to push the circuit breaker toward the front of the cubicle.

2. In the switchboard of claim 1, the structure of said vertical support wall of said cradle in which each of said openings in said wall for the upper and lower stationary disconnect contacts in the cubicle is provided with a plurality of forwardly directed walls surrounding each of said contacts and forming barriers therebetween.

3. In the switchboard of claim 2, the arrangement of said upper and lower stationary disconnect contacts which provides three sets of said contacts; and in which the said forwardly directed walls for each contact together form six box-like enclosures each open at the front end for said contacts.

4. The switchboard of claim 2 wherein the circuit breaker sets of disconnect contacts are protected by said forwardly directed barrier walls on said vertical support wall of insulating material when said circuit breaker disconnect contacts and said cubicle stationary contacts are engaged.

5. The switchboard of claim 3 wherein a plurality of cubicles are provided for a plurality of circuit breakers; and wherein each cubicle and each cradle may receive different circuit breakers of different current carrying capacity; and having circuit breaker sets of disconnect contacts protected by said barriers on said vertical support wall of insulating material when the said circuit breaker disconnect contacts and said cubicle stationary disconnect contacts are engaged.

6. In the switchboard of claim 1, the structure of the cradle wherein said tracks are adopted to receive rollers; and the circuit breaker is provided with a plurality of rollers adapted to ride on said tracks;

said tracks having extensions adapted to extend out the front opening of said cubicle to support the front end of the circuit breaker as it is withdrawn from the cubicle; said extensions being retractable into said track to lie entirely within said cubicle.

7. The switchboard of claim 4 wherein said vertical support wall of said cradle also carries the means for connecting said stationary disconnect contacts to said buses.

8. The switchboard of claim 7 wherein auxiliary switches having secondary contacts are provided; said cradle carrying said auxiliary switches; and means carried by said circuit breaker for operating said auxiliary switches.

9. The switchboard of claim 1 wherein the cradle carries a contact connectable to ground; and the circuit breaker structure carries a complementary contact engageable with said first mentioned ground contact when the circuit breaker is inserted in the cubicle.

* * * * *